United States Patent

[11] 3,593,800

| [72] | Inventor | Stanley O. Hutchison |
| | | Bakersfield, Calif. |
| [21] | Appl. No | 852,857 |
| [22] | Filed | Aug. 25, 1969 |
| [45] | Patented | July 20, 1971 |
| [73] | Assignee | Chevron Research Company |
| | | San Francisco, Calif. |

[54] APPARATUS FOR MAKING PREFORMED FOAM FOR USE IN WELLS
4 Claims, 5 Drawing Figs.

[52] U.S. Cl. .................................................. 166/312, 166/75, 175/69
[51] Int. Cl. .................................................. E21b 21/00, E21c 7/06
[50] Field of Search .................................................. 166/305, 309, 67, 75, 312; 175/69; 252/307, 359

[56] References Cited
UNITED STATES PATENTS

| 1,660,402 | 2/1928 | Thomson | 252/307 |
| 1,737,623 | 12/1929 | Thomson | 252/359 |
| 1,874,209 | 8/1932 | Schnabel | 252/307 |
| 2,125,245 | 7/1938 | McCray | 252/359 |
| 3,130,798 | 4/1964 | Schramm et al. | 175/69 |
| 3,486,560 | 12/1969 | Hutchison et al. | 175/69 |

*Primary Examiner*—James A. Leppink
*Attorneys*—A. L. Snow, F. E. Johnston, F. L. Freeland, Jr. and E. J. Keeling

ABSTRACT: A foam generator for use in mixing gas and a foamable solution to preform a foam for use as a circulating fluid in a well.

PATENTED JUL 20 1971

INVENTOR.
STANLEY O. HUTCHISON
BY Edward J Keeling
ATTORNEY

APPARATUS FOR MAKING PREFORMED FOAM FOR USE IN WELLS

CROSS REFERENCE RELATED APPLICATIONS

The present invention is related to the field of inventions disclosed and claimed in copending U.S. applications Ser. No. 704,832, filed Feb. 12, 1968; Ser. No. 720,977, filed Apr. 12, 1968; Ser. No. 807,766, filed Mar. 13, 1969; Ser. No. 835,268, filed June 20, 1969; Ser. No. 838,082, filed July 1, 1969 and Ser. No. 838,083, filed July 1, 1969.

BACKGROUND OF THE INVENTION

The invention relates to apparatus for producing foam from a foamable solution and gas for use as a circulation fluid in an oil or gas well or the like, and, more particularly, the invention provides a foam generator for use in intimately mixing a foamable solution and a gas stream on the surface to produce a preformed foam acceptable for use as a well circulating fluid.

As has been disclosed in the above-noted applications, gas and liquid foam is now used in the art as a circulating fluid in oil, gas and other wells. Foam, for example, provides an excellent low density circulating fluid for use in removing sand from wells and particularly from wells penetrating relatively low-pressure formations where it is desired to remove material without having the circulating fluid damage such a formation. Foam is also being used in wells to clean well liners which become plugged by materials such as asphaltene deposits and scale. Foam is also used as a circulating fluid for placing material in wells and into formations penetrated by wells. The above-described techniques require that a stable preformed foam be formed at the earth's surface for circulation in a well. It is also important that the foam be formed with a minimum pressure drop in the surface apparatus. There is thus a need for apparatus for forming stable foam with a minimum pressure drop in the apparatus which provides a stable preformed foam useful as a circulating fluid in wells.

SUMMARY OF THE INVENTION

The present invention is directed to apparatus for preforming foam for use as a circulating fluid in a well. The invention includes a foam generator which is connected to a source of gas and a source of liquid foamable solution. The generator comprises a tubular member having a gas entry port formed at one end. A liquid entry port is located on the side of the tubular member below the gas entry port. The interior of the tubular member contains foam generating means for intimately mixing the gas and foamable solution. A foam exit is formed at the other end of the tubular member and is connected to a conduit. This conduit is connectable to either a tubing string or to a well annulus for circulating foam in a well. The foam-generating apparatus thus provides a stable preformed foam suitable for use in well operations.

BRIEF DESCRIPTION OF THE INVENTION

The apparatus of the present invention includes a foam generator which is connected to a source of gas and a source of liquid foamable solution. The generator comprises a tubular member having an enlarged body portion formed between its ends. One end of the tubular member is provided with a gas entry port for flowing gas into the tubular member along the longitudinal axis thereof. Immediately downstream of this gas entry port and on the side of the tubular member a liquid entry port is formed. The liquid entry port contains an entry tube which provides a spray of foamable solution into the gas stream entering the tubular member. The spray of solution is directed into the gas stream in a direction which is substantially at right angles with the gas flow. Immediately downstream of the point where the gas and foamable solution are brought together at right angles, the interior of the tubular member is randomly packed with foam-generating means as, for example, with metallic pall rings. The pall rings are maintained in place by porous trays placed in the tubular member above and below such rings. A foam exit is provided on the end of the tubular member below the downstream screen. The foam exit is connected to a conduit and this conduit is connectable to a well. Foam from the foam generator is injected into such a well for use therein.

OBJECTS OF THE INVENTION

A particular object of the present invention is to provide apparatus for preforming foam on the earth's surface suitable for use in well operations. Further objects and advantages of the present invention will become apparent from the following detailed description read in light of the accompanying drawings which are made a part of this specification.

DESCRIPTION OF THE PREFERRED EMBODIMENT

Figure 1:
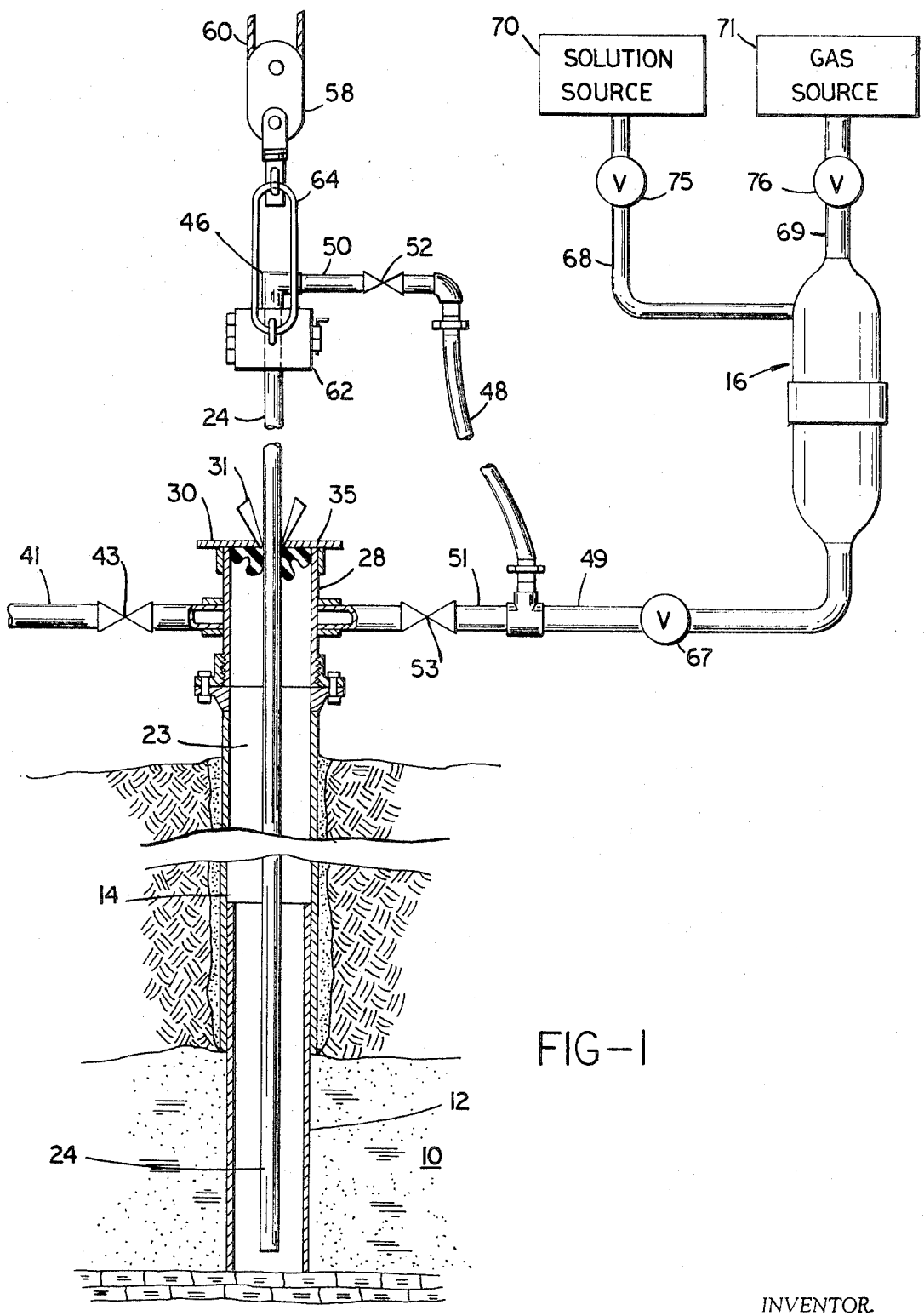
FIG. 1 is a view of the preferred embodiment of apparatus assembled in accordance with the invention for preforming and using foam in well operations.

Refer now to the drawings and to FIG. 1 in particular where the preferred embodiment of apparatus assembled in accordance with the invention is illustrated. FIG. 1 shows an elevation view, partially in section, of a well which penetrates the earth to an oil-bearing formation 10. This is the general environment where the apparatus of the present invention finds utility. The portion of the well adjacent producing formation 10 contains a perforated or otherwise suitably slotted well liner 12. The well liner 12 is connected to suitable casing 14 which extends from the upper portion of the producing formation through the earth to the surface. The well liner is placed during completion of the well and oil from the producing formation enters the well through the slots in the well liner 12. Sand may also enter the well through such slots and collect in the well and eventually hinder production therefrom. In accordance with the present invention, foam is circulated to remove such sand and other undesirable material from the well. The present invention is also useful, of course, when initially drilling the well to remove cuttings and the like from the well and also to circulate material in the well.

In accordance with the preferred form of the invention, a foam generator generally indicated by the number 16 is connected through suitable valves 75 and 76 to a foamable solution source 70 and a gas source 71. Foam is formed by mixing the foamable solution and the gas together in the foam generator. The foam must be preformed on the surface and have good lifting capability in order to efficiently remove chips, sand, gravel and the like from the well. The gas source and the foamable solution source are connected to one end of the foam generator 16 by suitable conduits 69 and 68, respectively. Valve 75 on the solution conduit 68 controls the amount of foamable solution which is used to generate the foam in foam generator 16. Valve 76 on gas conduit 69 controls the flow of gas from gas source 71 to the foam generator 16. The gas conduit is connected to the top of the foam generator 16 and causes gas flow therein in a direction substantially parallel to the longitudinal axis of the foam generator. The foamable solution conduit is connected at the side of the foam generator downstream of the gas conduit. The foamable solution is thus injected into the foam generator downstream of the gas and at right angles to the longitudinal axis of the generator so as to provide better initial mixing with the entering gas.

A conduit 49 connects the outlet of the foam generator 16 to the well. This conduit is connected to provide foam to either or both the well annulus 23 or a tubing string 24 located in the well. Thus normal circulation, i.e., down the tubing and up the annulus, and reverse circulation, i.e., down the annulus and up the tubing, and simultaneous injection down both tubing and annulus may be done. Conduit 49 is connected to the tubing string 24 through flexible conduit 48, conduit 50 and elbow joint 46. Valve 52 is used to control the foam flow to the tubing string. Conduit 49 is connected to the well annulus 23 by means of conduit 51 via wellhead 28. Valve 53 controls foam flow from the foam generator 16 to the well annulus 23.

The tubing string 24 is positioned in the well through a suitable wellhead 28. The particular size and type of the tubing string will depend upon the particular well being serviced. Both segmented and continuous tubing strings are useful in the present invention. When using a segmented tubing string, slips 31 are positioned on a slip base plate 30 which is connected to the top of the wellhead 28. Slips are used to hold the tubing string during make up of the string. Stripper rubber 35 is used in the wellhead 28 to prevent leakage of foam past the tubing string at the wellhead. The lower end of tubing string 24 is positioned in the well adjacent where the sand or other undesirable material to be removed is located. The tubing string and the well liner 12, well casing 14 form a well annulus 23. A normal path for circulating foam through the well is provided down the interior of tubing string 24 and up well annulus 23. A blooey line 41 is connected through valve 43 to well annulus 23 for exhausting foam from the annulus 23. Valve 43 also controls the back pressure placed on foam being circulated in the well. The tubing string may be raised or lowered in the well during foam circulation by suitable hoist means which includes a traveling block 58 which is moved by suitable cable 60. A conventional hoist means or derrick, not shown, is used to move the traveling block up and down. The elbow joint 46 which is connected to the upper end of the tubing string 24 is held in an elevator 62. The elevator 62 is connected by suitable links 64 to the traveling block 58. Thus when the traveling block 58 moves up or down, the tubing string and the apparatus connected thereto is also raised or lowered.

The foam for use as the circulating media in the above described apparatus is formed by bringing together a foamable solution and a suitable gas. The preferred liquid foamable solution is an aqueous surfactant solution. Numerous gases are available for use with such a liquid surfactant solution to form a foam. Such gases include air, nitrogen, natural gas and carbon dioxide. Because of its availability and low coast, air is usually the preferred gas. However, nitrogen and natural gas, when available, have an advantage over air in that the danger of fire in an oil well is reduced. Often these gases are available in an oil field at high pressure from an underground formation and when so available provide an excellent gas for the foam. Suitable foams and specific surfactants which go into the foamable solutions are described in detail in application Ser. No. 704,832, filed Feb. 12, 1968 and now U.S. Pat. No. 3,463,231 and the disclosure of such application is incorporated herein by reference. The preferred surfactant for use in the present invention is a $C_{11}$—$C_{14}$ alkylbenzene sulfonate (ABS) preferably the ammonia salt. The surfactant should be added to water to form a foamable solution in an amount between 0.5 to 1.0 parts by weight per 100 parts of water. A foamable solution is then mixed with a gas in the foam generator in a manner as set out in detail below.

Figure 2:
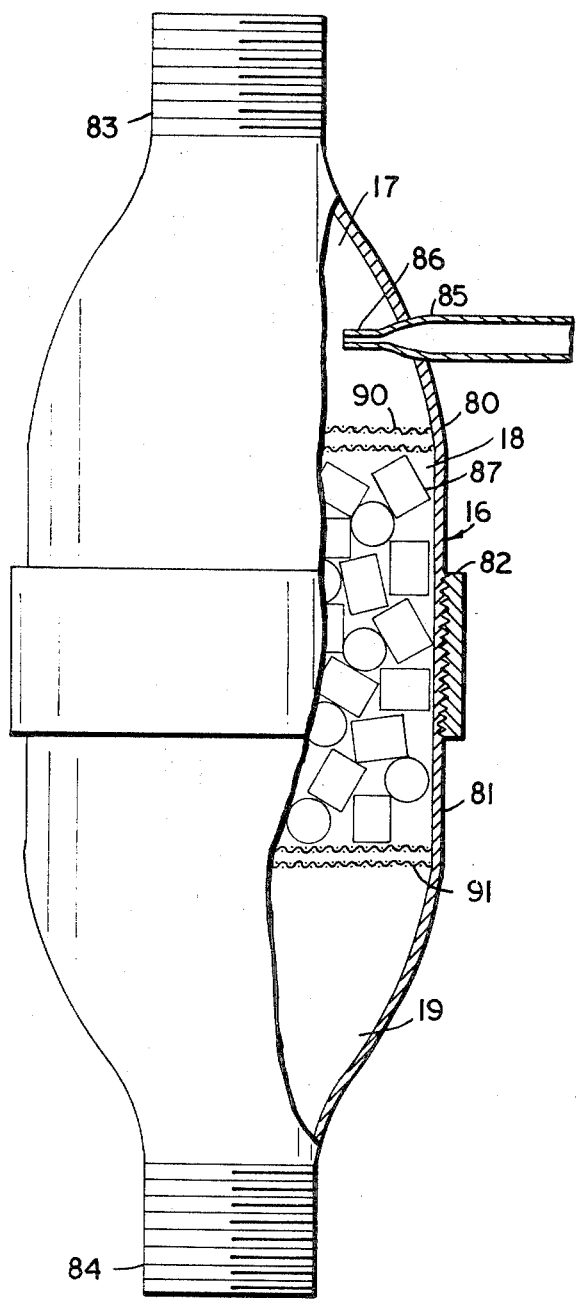
FIG. 2 is an enlarged view, partially in section, of the preferred foam generator assembled in accordance with the invention.

Referring specifically to FIG. 2, a view, partially in section, of foam generator 16 is shown. The interior of the foam generator is divided into three general zones. The zones are an initial gas foamable solution mixing zone 17; a foam generating zone 18 and a preformed foam exit zone 19. These zones are formed within the tubular member which forms the walls of the foam generator. In accordance with the preferred form of the invention, the tubular member is formed by connecting two bell-shaped nipples 80 and 81 together by means of a suitable collar 82. The ends 83 and 84 of the tubular member are provided with threads for connecting, respectively, a gas entry conduit and a preformed foam exit conduit thereto. The nipples are connected together to form an elongated tubular member in which foam is generated. Gas is directed into the tubular member in a direction parallel to the longitudinal axis thereof through the end 83 of the upperside of the tubular member. A foamable solution intake port is provided in the side of the tubular member below the gas intake 83. An intake tube 85 is connected into this port. The downstream end of the intake tube is connected to a liquid foamable solution source and directs the solution into the gas-foamable solution mixing zone 17 at right angles to the direction of gas flow to insure complete mixing of the gas and solution streams. The end 86 of the intake tube 85 which enters the side of the tubular member is flattened to cause the fluid to be sprayed into the chamber. In this manner intimate mixing of the gas and foamable solutions in the mixing zone is insured.

Figure 4:
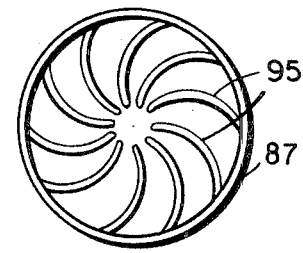
FIG. 4 is a top view of a pall ring preferred for use in packing the foam generator.
Figure 3:
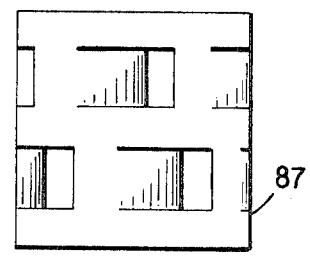
FIG. 3 is a side elevation of a pall ring preferred for use in packing the foam generator.
Figure 5:
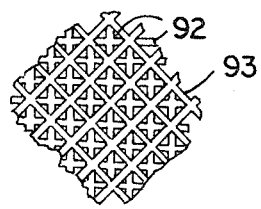
FIG. 5 is a top view of a portion of the preferred tray for use in holding pall rings in the foam generator.

The intimately combined gas-solution mixture then flows through porous tray 90 into the foam-generating zone 18. The interior of the foam-generating zone 18 is filled with a suitable foam generating means to cause the gas and liquid to be foamed in a manner suitable for well operations. The foam-generating means is formed of a plurality of separate elements which act to break up the flow of the gas-solution mixture through the foam-generating zone. The elements must be easily removable when the zone becomes plugged and must not cause an unnecessarily high pressure drop during operation. A preferred type of such an element is a pall ring 87. A plurality of such rings are used to fill the interior of the foam-generating zone 18. The pall rings 87 are randomly placed in the tubular member and are held in place by trays 90 and 91 located in the tubular member at the upper and lower ends of the foam-generating zone 18. Each of these trays, as indicated in FIG. 5, are formed by two ¼-inch wire mesh screen ⅛-inch thick. The two screens are cut in circular form and overlaid together at a 45° angle. The so formed trays 90 and 91 are used to retain the pall rings in the tubular member. The pall rings 87 are cylindrical metal bands having indented fingers 95 extending interiorally thereof. Such a ring 87 and the construction thereof are shown in detail in FIGS. 3 and 4.

From field development it has been found that a suitable foam generator is formed when the gas intake conduit is a 2-inch line and the foamable solution intake is a 1-inch line having its end flattened to leave a 1/16-inch wide by about 1-inch long opening therein. The solution intake tube is positioned to direct a flat spray into the gas stream. The gas and solution conduit are positioned at right angles to each other. A tubular member having a diameter of between 4 and 12 inches is provided to form the walls of the foam generator. A 10-inch diameter tubular member is most highly preferred. Pall rings are located in the foam-generating zone. The preferred size of pall rings are five-eighths inches tall and five-eighths inches in diameter. The pall rings are the type normally used in processing trays. The length of the foam generator is preferably between 18 and 30 inches with about 24 inches being highly preferred. A highly preferred mixture for use in such foam generator comprises between 10 and 30 gallons of foam solution per minute and between 150 and 300 cubic feet of gas per minute. The most desirable foam is formed when about 10 gallons of foamable solution a minute is mixed with 200 c.f.m. gas.

The present invention discloses a foam generator which is used to preform foam for use in a circulating system of a well. Although certain specific embodiments of apparatus have been disclosed, the invention is not limited thereto but is meant to include all embodiments coming within the scope of the appended claims.

I claim:

1. Apparatus providing foam for use in a well comprising a foamable solution source, a gas source, a hollow tubular member, conduit means connecting said gas source to one end of said tubular member for flowing gas into said tubular member along the longitudinal axis thereof, conduit means connecting said foamable solution source with said tubular member near the upper end thereof and arranged to direct foamable solution into the center of said tubular member at substantially right angles to the direction of gas flow in said tubular member, foam-generating means in said tubular member downstream of the gas conduit and the foamable solution conduit, said foam-generating means comprising a plurality of elements which break up the flow of the gas-foamable solution through said tubular member, a foam outlet at the other end of said tubular member and conduit means for connecting the foam outlet of said tubular member with a well.

2. Apparatus of claim 1 further characterized in that the foam-generating means comprises randomly packed pall rings.

3. Apparatus of claim 1 further characterized in that the end of the conduit means for the foamable solution which enters the tubular member is flattened to provide a spray of solution into said tubular member.

4. A method of providing preformed foam for use in a well comprising flowing foamable solution from a foamable solution source to a mixing zone, injecting gas into said mixing zone, injecting said foamable solution into said mixing zone at right angles to the gas entering said mixing zone to form a gas-foamable solution mixture, flowing said mixture to a foam generating zone, breaking up the flow of the gas-foamable mixture in said foam-generating zone to produce a stable foam, removing said stable foam from said foam-generating zone and injecting said foam down a well.